(12) United States Patent
Nabeshima et al.

(10) Patent No.: US 8,788,131 B2
(45) Date of Patent: Jul. 22, 2014

(54) CONTROLLER FOR TAKING MEASURES AGAINST ABNORMAL SHIFT UPON STARTING MOTOR-DRIVEN VEHICLE

(75) Inventors: Hisahiro Nabeshima, Kanagawa (JP); Hidemitsu Nakagawara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/697,479

(22) PCT Filed: Apr. 20, 2011

(86) PCT No.: PCT/JP2011/059704
§ 371 (c)(1),
(2), (4) Date: Nov. 12, 2012

(87) PCT Pub. No.: WO2011/142223
PCT Pub. Date: Nov. 17, 2011

(65) Prior Publication Data
US 2013/0124023 A1 May 16, 2013

(30) Foreign Application Priority Data
May 14, 2010 (JP) ................................. 2010-111620

(51) Int. Cl.
*F16H 59/02* (2006.01)
(52) U.S. Cl.
USPC ................................. 701/22; 701/51; 475/132

(58) Field of Classification Search
USPC ........................................ 475/132; 701/22, 51
See application file for complete search history.

(56) References Cited

U.S. PATENT DOCUMENTS

| 6,659,900 | B2 | 12/2003 | Nagasaka et al. |
| 7,835,839 | B2* | 11/2010 | Hori et al. ........................ 701/51 |
| 2002/0166399 | A1* | 11/2002 | Nagasaka et al. ............... 74/335 |
| 2010/0320018 | A1* | 12/2010 | Gwozdek et al. .......... 180/65.27 |
| 2011/0178663 | A1* | 7/2011 | Crombez ........................ 701/22 |

FOREIGN PATENT DOCUMENTS

| JP | 2002-257226 A | 9/2002 |
| JP | 2004-324849 A | 11/2004 |
| JP | 2010-36880 A | 2/2010 |
| JP | 2010-105490 A | 5/2010 |

* cited by examiner

*Primary Examiner* — Helal A Algahaim
*Assistant Examiner* — Michael Fouche
(74) *Attorney, Agent, or Firm* — Foley & Lardner LLP (57) ABSTRACT

When a traveling drive system is activated at a time t2 in response to a turning of an ignition switch to an ON state at a time t1, a request of P/N inhibit (a park lock release inhibit) from an electrically operated motor controller vanishes. Therefore, originally, according to an execution of a park lock release, the vehicle is started in response to a holding of a D position of a shifter. However, in a case where a park lock release inhibit state occurs at a time immediately before time t2 and the shifter is at the D position at time t2, a present shift inhibit flag takes over the park lock inhibit state at the time immediately before t2 until a time t3 at which the shifter returns to a home (H) position so that the above-described start of the vehicle is prevented.

4 Claims, 6 Drawing Sheets

CONTROLLER FOR TAKING MEASURES AGAINST ABNORMAL SHIFT UPON STARTING MOTOR-DRIVEN VEHICLE

TECHNICAL FIELD

The present invention relates to a safety measure technique against a shift abnormality when a traveling drive system of an electrically driven vehicle, especially of such a vehicle as an electric automotive vehicle or a hybrid vehicle, which is started by a motive power from an electrically operated motor, is made in an activation state when the vehicle is started.

BACKGROUND ART

Electrically driven vehicles have been proposed in which a vehicle driver performs a shift operation, when commanding a traveling mode including a vehicle stop for a, so-called, momentary type shifter which is, in a normal state, self reset to a reference position, operated from the reference position to one of positions of Neutral position (N), a forward (D) run position, and a reverse (R) run position, each of which corresponds to a desired traveling mode, so that a command in the above-described traveling mode is issued. Part of the above-described vehicles has already been put into practice.

At an instant time when the above-described shift operation is performed, the shifter issues a signal corresponding to the traveling mode that the vehicle driver desires (normally, an electrical signal). The vehicular traveling drive system is controlled in response to the signal from the shifter so that the vehicle can appropriately run by means of a dynamical power from the traveling drive system in a traveling mode (including the stop of the vehicle) that the vehicle driver desires.

Incidentally, the self-resetting shifter (momentary type) is shift operable with a slight force as compared with a shift lever normally used in an automatic transmission which mechanically commands the traveling mode. Hence, it often occurs that the shifter is kept operated from the reference position to other position according to a mere touch of an obstacle such as a book onto the shifter.

When the shifter is kept to be operated from the reference position to another position against an intention of the driver, the driver turns an activation switch such as an ignition switch to an ON state while the driver is not aware of it to switch the traveling drive system of the vehicle from the reference position to the other position in response to the state switching operation. Hence, since, as described above, the shifter is kept operated from the reference position to the other position, the vehicle is started in the traveling mode that corresponds to the operation position of this shifter.

However, the driver himself does not touch the shifter and is convinced that this shifter is placed at the reference position and the vehicle is not started even if the activation switch is turned to ON for the traveling drive system to be switched into the activation state. Hence, an occurrence of such a situation that a mere activation state of the traveling drive system due to the ON of the activation switch flusters the driver so that it is necessary to avoid this situation in terms of a safety driving.

In order to avoid the occurrence of the situation described above, it can be thought that use is made of a technique described in, for example, a Patent Document 1.

This proposed technique is an improvement proposal as described below for a range selection system of a shift-by-wire type in the automatic transmission.

The range selection system in the shift-by-wire type is such that the operation position of the shift lever by the vehicle driver is electrically detected and the motor is activated in response to the detection signal so that the automatic transmission is transferred into a range selection state that the vehicle driver desires.

Even in the shift-by-wire type range selection system, the shift lever of the self-resetting type (momentary type) is used. In this case, since this shift lever is shift operable with the slight force, the shift lever is kept operated from the reference position to the other position against the intention of the vehicle driver and the automatic transmission is forced into the range selection state that the vehicle driver does not desire.

In order to prevent such a situation as described above, Patent Document 1 describes that a shift allowance switch to be operated by the driver when the shift operation is carried out is additionally installed and unless the operation of the shift allowance switch and the operation of the self-resetting type (momentary type) shift lever are made almost concurrently, the automatic transmission is not switched to the range corresponding to the shift lever operation.

In a case where the same thought as the above-described measure is applied to the shift abnormality measure upon activation for the vehicle, a shift allowance switch is additionally installed. Even if the shifter is kept at the position different from the reference position, the switching is not carried out to the traveling mode corresponding to the present operation position of the shifter unless the driver manipulates this shift allowance switch.

Hence, the occurrence of the situation such that the vehicle is started against the intention of the vehicle driver at least when the shift abnormality occurs can be avoided.

However, if the measure described in Patent Document 1 is applied, an addition of the shift allowance switch is indispensable. In addition, it is necessary to provide a wire harness to transmit the signal from the shift allowance switch. Consequently, a high cost of the measure described above cannot be avoided.

PRE-PUBLISHED DOCUMENT

Patent Document

Patent Document 1: (tokkai) JP2002-257226

DISCLOSURE OF THE INVENTION

It is an object of the present invention to provide a control apparatus for taking measures against a shift abnormality upon activation for the electrically driven vehicle which is capable of eliminating, at a low cost, a problem such that the vehicle is started against the intention of the vehicle driver without addition of a new component or without addition of the wire-harness by inhibiting the transfer to the traveling mode corresponding to the shift operated position of the shifter at the time of determination of the shift abnormality, from a viewpoint such that the vehicle driver does not operate the shifter such as the self-resetting type (momentary type) shifter or the shift lever of the automatic transmission to the other position than the reference position, when the traveling drive system is made in the activation state with the electrically driven vehicle started and this state can be determined to be the shift abnormality upon activation for the vehicle.

To achieve the above-described object, a control apparatus for taking measures against a shift abnormality upon activation for an electrically driven vehicle according to the present invention can be structured as follows:

First, a vehicle which is a prerequisite for the present invention will be explained below. The vehicle is an electrically driven vehicle which is started by a motive power from an electrically operated motor and is capable of traveling according to the dynamical power from the traveling drive system in a traveling mode corresponding to a signal from the shifter when, with the traveling drive system of the electrically driven vehicle activated, the shifter is operated from the reference position.

The present invention is characterized by a structure including system activation detecting means, shift abnormality detecting means, and traveling mode transfer inhibiting means, for the electrically driven vehicle.

First, the system activation detecting means detects whether a switching from a non-activation state of the traveling drive system to an activation state thereof is made.

In addition, the shift abnormality detecting means detects whether the shifter is kept at a position other than the above-described reference position.

Furthermore, even if the system activation detecting means detects the switching to the activation state of the traveling drive system, the transfer to the traveling mode corresponding to the position other than the reference position is inhibited while the shift abnormality detecting means detects that the shift is kept at the position other than the reference position.

In the control apparatus for taking measures against the shift abnormality upon activation for the electrically driven vehicle according to the present invention, even if the switching to the activation state of the traveling drive system occurs, the transfer to the traveling mode corresponding to the position other than the reference position is inhibited while the shifter is kept at the position other than the reference position. Thus, when the vehicle driver causes the traveling drive system to be in the activation state not noticing that the shifter is kept at the position other than the reference position due to the presence of an obstacle or so forth, the vehicle is not started against an intention of the vehicle driver and it is advantageous in terms of safety.

In addition, through only the detection of the switching to the activation state of the traveling drive system and the detection that the shifter is kept at the position other than the reference position, namely, when only these detections are carried out using the already existing signals, the above-described action and effects can be obtained at a low cost without addition of new component(s) and addition of wire-harness.

DESCRIPTION OF THE EMBODIMENTS

The embodiments according to the present invention will be described in details on a basis of preferred embodiments shown in the drawings.

<Structure>

Figure 1:
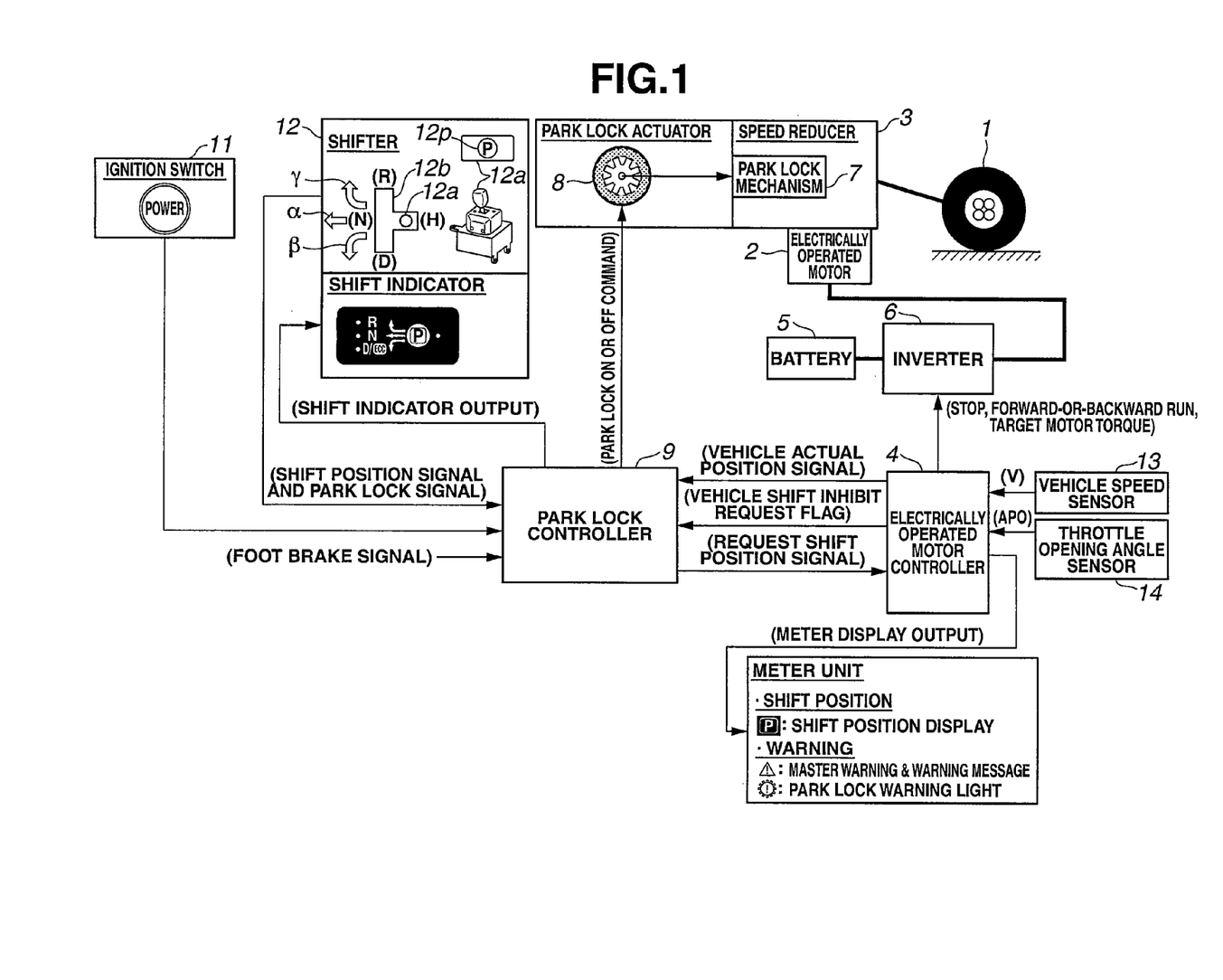
FIG. 1 is a rough system configuration view representing a vehicular drive train and its control system of a vehicle in which a control apparatus for taking measures against a shift abnormality upon activation in a preferred embodiment according to the present invention is equipped.

FIG. 1 shows a drive train of an electrically driven vehicle and its control system in which a control apparatus for taking measures against a shift abnormality upon activation in a preferred embodiment according to the present invention is equipped, these drive train and control system constituting a traveling drive system of the vehicle.

The electrically driven vehicle in this embodiment in which the traveling drive system shown in FIG. 1 is equipped is assumed as an electric automotive vehicle travelable by driving road wheels 1 through an electrically operated motor 2. Left and right road wheels 1 are driven via a speed reducer (including a differential gear unit) by means of an electrically driven motor 2 when these left and right road wheels 1 are driven.

When a driving control for electrically driven motor 2 is performed, an electrically operated motor controller 4 performs a DC-AC conversion for an electric power of a battery 5 through an inverter 6 which is a power supply and supplies this converted alternating current power under a control of inverter 6 to electrically driven motor 2 so that the control for electrically driven motor 2 is performed to make the torque of electrically operated motor 2 coincident with a calculation result in electrically operated motor controller 4 (a target motor torque including 0 at the time of the vehicle stop and a rotational direction of the motor for a forward-or-backward (reverse) run).

It should be noted that an electrically charged state of battery 5 is held in a predetermined state by charging the electric power from an external power supply when the charged state of battery 5 is reduced.

It should be noted that, in a case where the result of calculation in electrically operated motor controller 4 (target motor torque) is minus (negative pole characteristic) which requires a regeneration braking action for electrically driven motor 2, electrically driven motor controller 4 gives a power generation load to electrically driven motor 2 via an inverter 6. At this time, the electric power generated by electrically operated motor 2 through a regenerative braking action is charged to battery 5 through an AC-DC conversion by means of inverter 6

In this embodiment, further, a park lock apparatus as described below is added to the above-described traveling drive system described above.

In a speed reducer 3, a park lock mechanism 7 which locks the revolution of road wheels 1 is incorporated into speed reducer 3. Although the detailed structure of park lock mechanism 7 is not shown, the same mechanism used in an automatic transmission is used.

That is to say, park lock mechanism 7 includes: a parking gear disposed to rotate with road wheels 1: a parking pawl pivotally supported on a casing of speed reducer 3; a parking pawl pivotally supported on a casing of speed reducer 3; and a park rod interposed between the parking pawl and a reaction force receiver for a parking pawl biased to be swung in a direction far away from the parking gear by means of a spring force to be swung in the direction toward the parking gear. When the park rod is in a push stroke and the parking pawl is swung in a direction toward the parking gear due to a cam action between a conical cam integrally disposed on the park rod and parking pawl and reaction force receiver, the parking pawl is swung toward the direction toward the parking gear so that a tip pawl of the parking pawl is engaged with a tooth of the parking gear to perform a revolution lock of road wheels (so called, a park lock)

It should be noted that the push stroke of the park rod or reverse pull stroke of the park rod is carried out by means of an electrically driven park lock actuator 8 and this park lock actuator 8 responds to park lock ON or OFF command from a park lock controller 9. The park lock apparatus in FIG. 1 is different from that of a mechanical type used in the automatic transmission but is an electronically controlled type (a by-wire control type).

Park lock controller 9 inputs the following signals in order to produce the above-described park lock ON or OFF command.

That is to say, the input signals includes: a foot brake signal indicating whether a foot brake is being operated representing that the driver depresses the brake pedal; a signal from an ignition switch 11 pressed in order to render the traveling drive system shown in FIG. 1 in an activation state or in a non-activation state (ignition switch 11 is switched between ON state and OFF state whenever switch 11 is pressed); and a shift position signal and a park lock signal from a shifter 12 operated to issue a command to issue a vehicular traveling mode (including a parking and stop of the vehicle) that the vehicle driver desires.

Shifter 12 includes an operator 12a positioned at a home (H) position as a reference position, in a normal state, so that the driver operates operator 12a to command a desired vehicle traveling mode (stop of the vehicle, the forward movement of the vehicle, and the reverse (backward) movement of the vehicle) to command a park lock by pushing a self-resetting type push button park lock switch 12p disposed on a top face of operator 12a. The driver when the above-described operation is carried out for operator 12a operates this operator 12a along a letter T shape shift pattern 12b and, in response to this operation, and, in response to this operation and, in response to a press of park lock switch 12p, shifter 12 functions in the following way.

At a moment when the driver desires the parking of the vehicle and pushes and resets park lock switch 12p on operator 12a placed at home (H) position, shifter 12 inputs the park lock signal to park lock controller 9. At this time, park lock controller 9 checks to see whether electrically driven controller 4 issues a parking inhibit request due to a reason such as under the drive of the electrically operated motor on a basis of a vehicular shift inhibit request flag from electrically driven motor controller 4.

Park lock controller 9 issues a park lock ON signal to park lock actuator 8 in response to the above-described park lock signal from shifter 12 if the vehicle is in a parking enabled state without a parking inhibit request. Park lock actuator 8 arises the press in stroke of the park rod in response to this park lock ON signal so that road wheels 1 are park locked according to the operation of park lock mechanism 7.

At this time, park lock controller 9 supplies a park (P) position signal to electrically operated motor controller 4 as a request shift position signal to electrically operated motor controller 4. Upon receipt of this parking (P) position signal, electrically operated motor controller 4 sets the target motor torque to inverter 6 to zero so that the vehicle can be set in the parking state in combination with the operation of park lock mechanism 7.

It should be noted that, when ignition switch 11 is turned to OFF so that the traveling drive system (electrically operated motor controller 4) is shut down, the vehicle is made in the parking state, park lock controller 9 actuating automatically park lock mechanism 7 for a safety purpose as described above, even if park lock switch 12p on shifter operator 12a is not pushed.

When the driver desires the parking state of the vehicle and the driver operates operator 12a from home (H) position to a neutral (N) position in a lateral direction denoted by an arrow α, shifter 12 supplies a shift position signal of neutral (N) to park lock controller 9. When the driver releases his hand from operator 12a, operator 12a resets automatically from the neutral position (N) to the home (H) position, shifter 12 inputs the shift position signal of home (H) to park lock controller 9.

During the series of operations described above, park lock controller 9 supplies a request shift position signal of the neutral (N) state to electrically operated motor controller 4 in response to the shift position signal of the neutral (N) issued from shifter 12 during the operation of operator 12a from home (H) position to neutral (N) position.

Electrically operated motor controller 4 receives the request shift position signal of the neutral (N), issues a command to stop the vehicle (target motor torque=0) to inverter 6 so that the vehicle can be stopped.

At this time, park lock controller 9 continues to issue a park lock ON command to park lock actuator 8 to continue the park lock state of road wheels 1.

When the driver desires a forward run of the vehicle so as to operate operator 12a from the home (H) position to the forward run (D) position in a reversely faced letter L shape direction denoted by β, shifter 12 supplies the shift position signal of the forward (D) run to park lock controller 9. When the driver releases his hand from operator 12a, operator 12a is automatically reset (self reset) from the forward (D) run position to home (H) position and shifter 12 supplies the shift position signal of home (H) position to park lock controller 9.

During the above-described series of operations, park lock controller 9 issues a park lock OFF command to park lock actuator 8 under a condition such that the foot brake signal indicates that a foot brake is being actuated, in response to the shift position signal of the forward (D) run issued from shifter 12 when the driver operates shifter 12a from home (H) position to forward (D) run position, and, simultaneously, supplies the request shift position signal of the forward run (D) to electrically operated motor controller 4.

At this time, park lock actuator 8, in response to the park lock OFF command, arises the push stroke of the park rod in response to the park lock OFF command. Thus, the release of the park lock makes road wheels 1 in a rotationally driven state.

In addition, electrically operated motor controller 4, upon receipt of the request shift position signal of the forward (D) run, issues the command on the forward rotation and the target motor torque to inverter 6 to enable the forward run of the vehicle.

Electrically operated motor controller 4 inputs a signal from a vehicle speed sensor 13 detecting a vehicle speed VSP which is a ground speed and a signal from an accelerator opening angle sensor 14 detecting an accelerator opening angle APO which is a requested load from the vehicle driver for electrically operated motor 2.

Electrically operated motor controller 4 calculates a required driving force required under the present driving state from detected vehicle speed VSP and accelerator opening angle APO to determine a motor torque by which this required driving force is realizable as a target motor torque.

Electrically operated motor controller 4 generates a PWM signal which controls electrically operated motor 2 to achieve the target motor torque obtained as described above and generates a drive signal for inverter 6 via a drive circuit according to the PWM signal.

Inverter 6 includes two switching elements, for example, for respective phases (for example, power semiconductor devices such as IGBTs), converts a direct current supplied from battery 5 into an alternating current and supplies an electric current corresponding to the target motor torque to electrically operated motor 2.

When the driver desires the reverse (backward) run of the vehicle so that operator 12a is operated from home (H) position to a reverse (R) run position in a forward directed letter L shape direction denoted by an arrow of γ, shifter 12 supplies the shift position signal of reverse run (R) to park lock controller 9.

When the driver releases his hand from operator 12a, operator 12a is automatically reset (self-reset) from reverse (R) run position to home (H) position, shifter 12 supplies the shift position signal of home (H) position to park lock controller 9.

During the series of operations described above, park lock controller 9 issues park lock OFF command to park lock actuator 8 under a condition such that the foot brake is being actuated, in response to the shift position signal of reverse (R) run issued from shifter 12 at a time of the driver operation of operator 12a from the home (H) position to reverse (R) run position and, at the same time, supplies the requested shift position signal of reverse (R) run to electrically operated motor controller 4.

At this time, park lock actuator 8 arises the pull stroke of the park rod in response to the park lock OFF command to release the park lock so that road wheels 1 are enabled to be in the rotationally driven state.

In addition, electrically operated motor controller 4, upon receipt of the requested shift position signal of reverse (D) run, issues the command on the reverse rotation to inverter 6 and the command on the target motor torque so as to enable the vehicle to make a reverse run.

It should be noted that the target motor torque at the time of the reverse run can be determined in the same procedure as the target motor torque at the time of the forward run.

<Control for Taking Measures Against the Shift Abnormality Upon Activation>

Park lock controller 9 executes a control program shown in FIGS. 2 and 3 to perform the control for taking measures against the shift abnormality upon activation which is an aim of the present invention as follows.

First, the shift abnormality at the time of activation will be described.

In a case where shifter 12 is, as shown in FIG. 1, the momentary type which is self reset (automatically reset) to the home (H) position which is the reference position when the driver has released his hand from operator 12a, shifter 12a is shift operable with the slight force. Hence, a mere touch of an obstacle such as a book on shifter 12 often keeps shifter 12a operated from the home (H) position to another position such as the forward (D) run position or the reverse (R) run position.

In this way, when shifter 12 is kept operated from the home (H) position to the other position, ignition switch 11 is turned to ON state while the driver is not aware of this operation state of shifter 12 so that the traveling drive system shown in FIG. 1 is switched from the non-activation state to the activation state. At this time, in response to the state switching described above and due to such a fact that shifter 12 is kept from the home (H) position to the other position, the vehicle is started in the traveling mode which corresponds to the shifter operated position (the shift position).

This phenomenon will be explained with reference to FIGS. 4 and 5.

Figure 4:
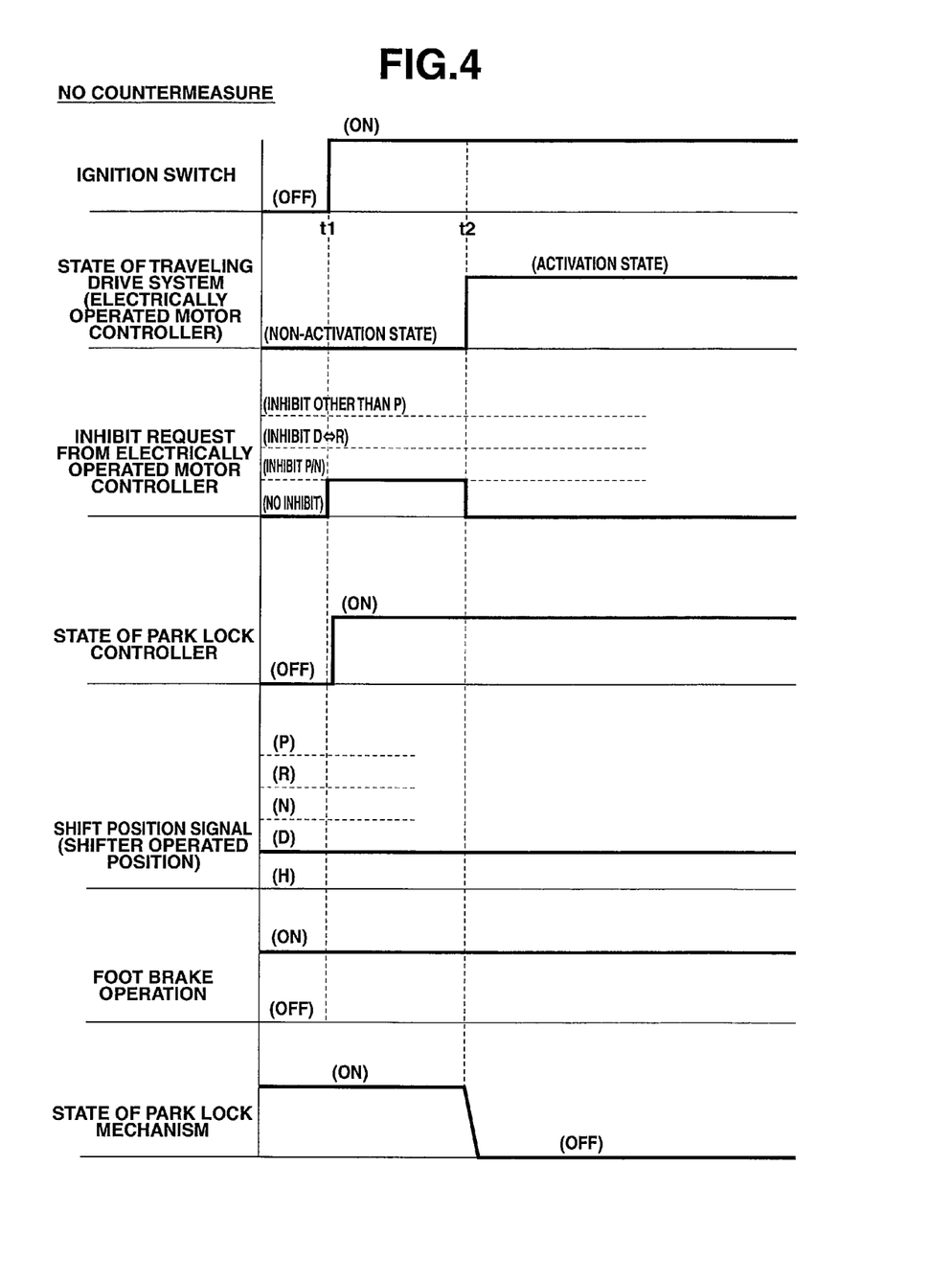
FIG. 4 is an operation timing chart for explaining a phenomenon such that the vehicle is started against an intention of the driver in a case where, after a long time has passed from a time at which a traveling drive system is made in a non-activation state in response to a turning of an ignition switch to OFF state, the vehicle driver turns again the ignition switch to ON state in order to re-activate an activation of the traveling drive system while the driver is not aware of the shifter kept operated from a home (H) position to a forward (D) position due to a presence of a book

FIG. 4 is an operational timing chart in a case where ignition switch 11 is turned to ON at an instantaneous time t1 at which the driver desires the activation of the traveling drive system (electrically operated motor controller 4) without noticing that shifter 12 is left operated from the home (H) position to the forward (D) run position due to the touch of the book on shifter 12 as appreciated from the shift position signal shown in FIG. 1, in a state where it takes a long time from the time at which the traveling drive system (electronically driven motor controller 4) is in the non-activation state in response to the switching of the OFF state of ignition switch 11 and park lock controller 9 confirms a completion of the park lock and is shut down (OFF).

Figure 5:
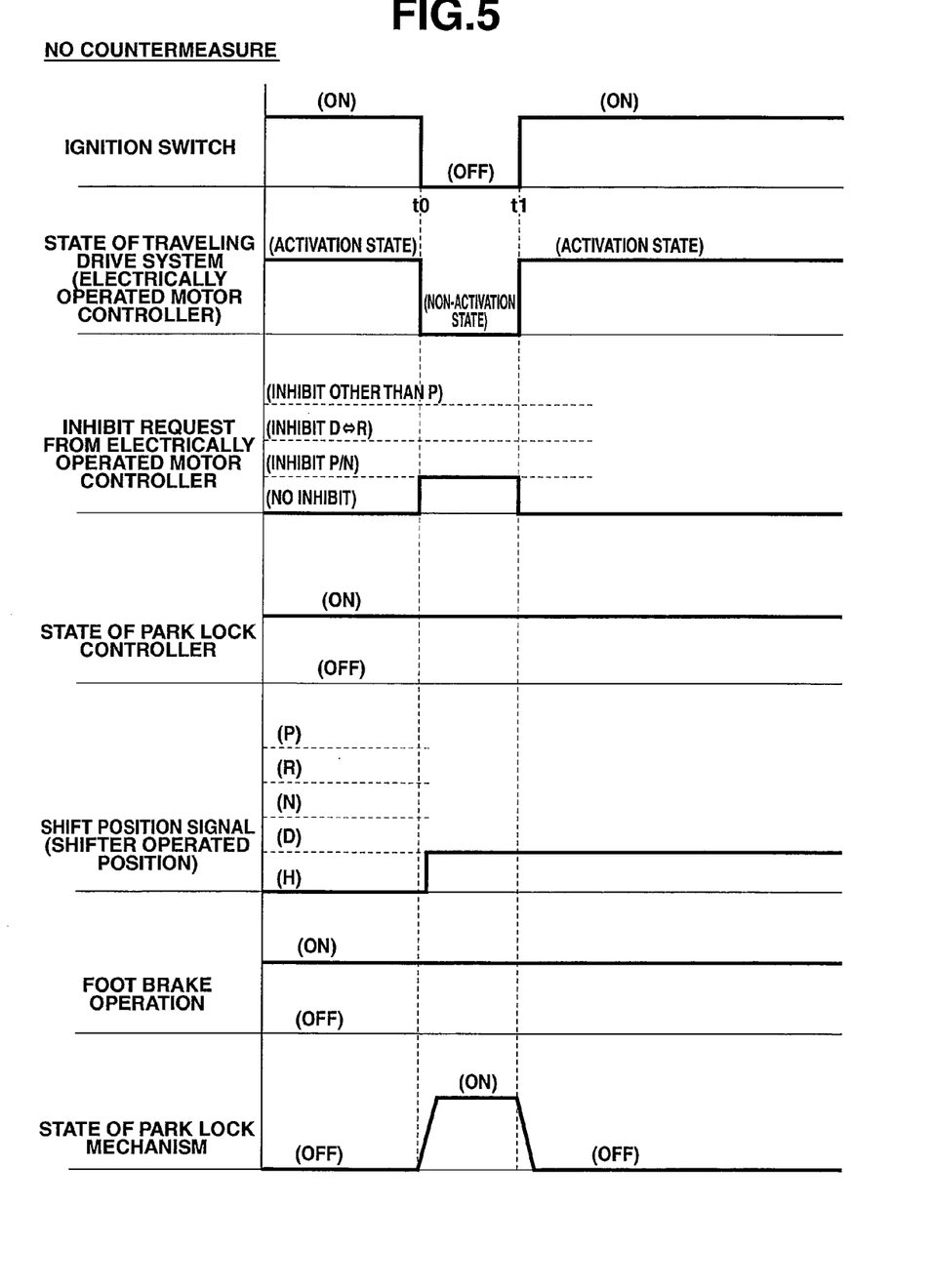
FIG. 5 is an operation timing chart for explaining a phenomenon such that the vehicle is started against the intention of the driver in a case where, in a short time from a time at which the traveling drive system is made in the non-activation state in response to a turning of the ignition switch to the OFF state, the vehicle driver turns again the ignition switch to ON state in order to re-activate the traveling drive system while the driver is not aware of the shifter kept operated from the home (H) position to the forward (D) run position due to the presence of the book.

In addition, FIG. 5 is an operational timing chart in a case where, at an instantaneous time t1 to which only a slight time has taken from an instantaneous time t0 at which ignition switch 11 is turned to the OFF state to make the traveling drive system (electrically operated motor controller 4) in the non-activation state, the turning ignition switch 11 to the ON state to re-activate the traveling drive system (electrically operated motor controller 4) so that the traveling drive system (electrically operated motor controller 4) is re-activated in response to the again ON of ignition switch 11 before park lock controller 9 confirms the completion of the park lock and is shut down (OFF) (as shown in FIG. 5, while park lock controller 9 is kept in the ON state), and the driver turns ignition switch 11 to the ON state again to re-activate the traveling drive system (electrically operated motor controller 4) at instantaneous time t1 without noticing that shifter 12 is kept operated from the home (H) position to forward (D) position due to the presence of the book after a certain time between instantaneous times t0 and t1 as appreciated from the shift position signal as shown in FIG. 5.

In a case of FIG. 4, in response to the ON state (at instantaneous time t1) of ignition switch 11, park lock controller 9 is switched to be turned to ON from the turned OFF state at a time immediately after time t1 and, during the time duration from instantaneous time t1 to an instantaneous time t2 at which an activation preparation is ended, the traveling drive system is switched from the non-activation state to the activation state.

The traveling drive system (electrically operated motor controller 4) is in the non-activation state for the time duration from instantaneous time t1 at which ignition switch 11 is turned to ON to instantaneous time t2 at which the system is switched to the activation state. At this time, electrically operated motor controller 4 issues a P/N inhibit command which inhibits a park lock release to park lock controller 9.

Park lock controller 9, in response to the P/N inhibit command, does correspondingly not perform the park lock release, even if the shift position signal (shift operation position signal) is left operated at the forward (D) run position against the intention of the driver and maintains the state of park lock mechanism 7 in the ON state (park lock).

However, the traveling drive system (electrically operated motor controller 4) does not issue the P/N inhibit command to inhibit the park lock release to park lock controller 9 since the traveling drive system (electrically operated motor controller 4) is in the activation state after instantaneous time t2 at which electrically operated motor controller 4 is switched to the activation state and the park lock release by means of park lock controller 9 is allowed.

Hence, after instantaneous time t2, park lock controller 9 executes the park lock release to be carried out as described before when the shift position signal (shifter operated position signal) is placed at the forward (D) run position so that the state of park lock mechanism 7 is in the OFF state (park lock release) after instantaneous time t2, since the shift position signal (shifter operated position signal) is placed at the forward (D) run position and the condition such that the foot bake is being actuated to be in the operation (ON) state is satisfied.

Park lock controller 9, furthermore, supplies the corresponding request shift position signal to electrically is operated motor controller 4 since the shift position signal (shifter operated position signal) is at the forward (D) run position and electrically operated motor controller 4 correspondingly rotates electrically operated motor 2 in the forward direction so as to transmit the driving torque to road wheels 1.

Consequently, in FIG. 4, without noticing that shifter 12 is left operated from the home (H) position to forward (D) run position against the intention of the driver, the driver switches the traveling drive system from the non-activation state to the activation state. Thus, in response to this state switching, at instantaneous time t2, shifter 12 is kept operated from the home (H) position to the forward (D) run position. Therefore, the vehicle is started in the forward direction in the traveling mode corresponding to the shifter operated position.

However, the driver himself does not touch shifter 12. Hence, the driver is convinced that shifter 12 is placed at the home (H) position and the vehicle is not started even if the traveling drive system (electrically operated motor controller 4) is switched from the non-activation state to the activation state, in response to the ON state of ignition switch 11.

Hence, only by switching the traveling drive system (electrically operated motor controller 4) to the activation state due to the ON state of ignition switch 11, the vehicle is started as described above. An occurrence of such a situation described above makes the driver confused and it is necessary to avoid this situation in terms of the safety driving.

In a case of FIG. 5, since the time duration from the OFF state (instantaneous time t0) of ignition switch 11 to the again ON (instantaneous time t1) is short, it is not necessary to prepare for switching the traveling drive system (electrically operated motor controller 4) from the non-activation state to the activation state so that, at the same time when ignition switch 11 is again turned to ON (instantaneous time t1), the traveling drive system (electrically operated motor controller 4) is switched from the non-activation state to the activation state.

On the other hand, park lock controller 9 confirms, in response to the OFF state of ignition switch 11 (instantaneous time t0), the completion of the park lock and receives again ON signal of ignition switch 11 before the shut down (OFF) of park lock controller 9 (during a time at which park lock controller 9 is still in the ON state). Hence, park lock controller 9 is held in the ON state during the time duration from instantaneous time t0 to instantaneous time t1 and after instantaneous time t1.

Then, park lock controller 9, in response to the non-activation state of the traveling drive system (electrically operated motor controller 4) along with the OFF state of ignition switch 11 (instantaneous time t0), automatically switches the state of park lock mechanism 7 from the OFF state (park lock release) to the ON state (park lock) so that the vehicle is in a parking state.

On one hand, the traveling drive system (electrically operated motor controller 4) is in the non-activation state during the time duration from the OFF state to of ignition switch 11 (instantaneous time t0) to instantaneous time t1 at which the traveling drive system is switched to the activation state due to the again ON state of ignition switch 11 so as to issue the P/N inhibit command which inhibits the park lock release to park lock controller 9. Park lock controller 9 upon receipt of P/N inhibit command does not correspondingly perform the park lock release even if the shift position signal (shifter operated position signal) is kept at a position of the forward (D) run position immediately after instantaneous time t0 and maintains the state of park lock mechanism 7 in the ON (park lock) state.

However, the traveling drive system (electrically operated motor controller 4) is in the activation state after instantaneous time t1 at which the traveling drive system switches to the activation state and does not issue the P/N inhibit command which inhibits the park lock release to park lock controller 9 so as to allow the park lock release by means of park lock controller 9. Hence, after instantaneous time t1, park lock controller 9 executes the park lock release to be carried out in the way as described above when the shift position signal (shifter operated position signal) indicates the forward (D) run position, since the shifter position signal (shifter operated position signal) is in the forward (D) run position and such a condition that the foot brake is placed at the ON position (actuation) state is satisfied, and, after instantaneous time t2, park lock controller 9 makes the state of park lock mechanism 7 in an OFF state (park lock release).

After instantaneous time t1, park lock controller 9 supplies the corresponding request shift position signal to electrically operated motor controller 4 since the shift position signal (shifter operated position signal) is at the forward (D) run position so that electrically operated motor controller 4, in response to this request shift position signal, makes electrically operated motor 2 rotate in the forward direction to transmit the drive torque to road wheels 1.

Consequently, as shown in FIG. 5, without noticing that shifter 12 is kept operated at forward (D) run position not, at the home position (H) immediately after instantaneous time t0 against the intention of the driver, the driver switches the traveling drive system (electrically operated motor 4) from the non-activation state to the activation state in response to the turning ON of ignition switch 11. At instantaneous time t2, in response to the state switching, as described above, shifter 12 is left operated from the home position (H) to the forward run (D) position. Thus, the vehicle is started in the forward direction in the traveling mode corresponding to the shifter operated position.

However, the driver himself does not touch shifter 12 and is convinced that the vehicle is not started even if this shifter 12 is placed at the home (H) position and the traveling drive system (electrically operated motor controller 4) is switched from the non-activation state to the activation state in response to the ON state of ignition switch 11.

Hence, a mere switching of the traveling drive system (electrically operated motor controller 4) into the activation state in response to the ON state of ignition switch 11 causes the occurrence of such a situation that the vehicle is started to move makes the driver flustered and it is necessary to avoid the occurrence of the situation described above in terms of the safety driving.

Figure 2:
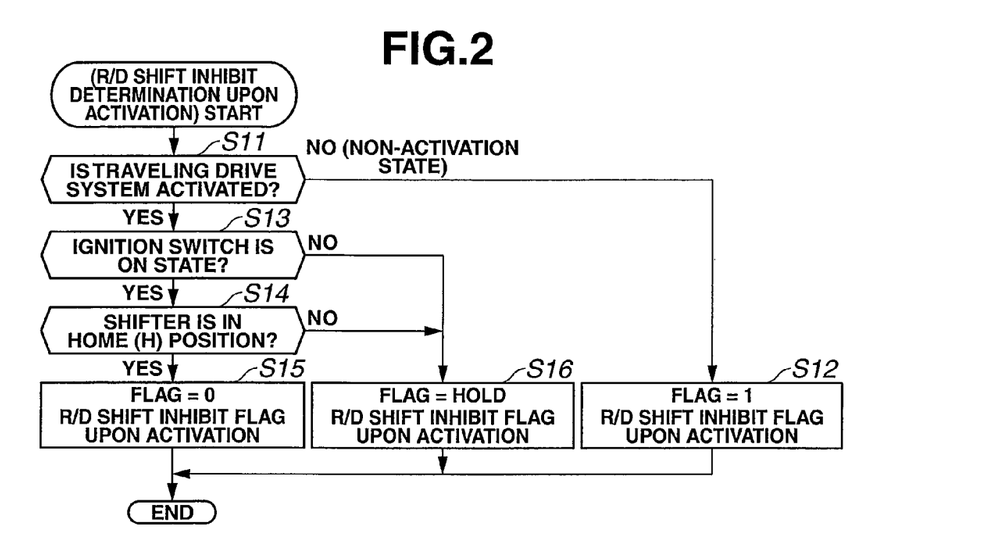
FIG. 2 is a flowchart representing an R/D shift inhibit determination program executed by an electrically operated motor controller shown in FIG. 1.
Figure 3:
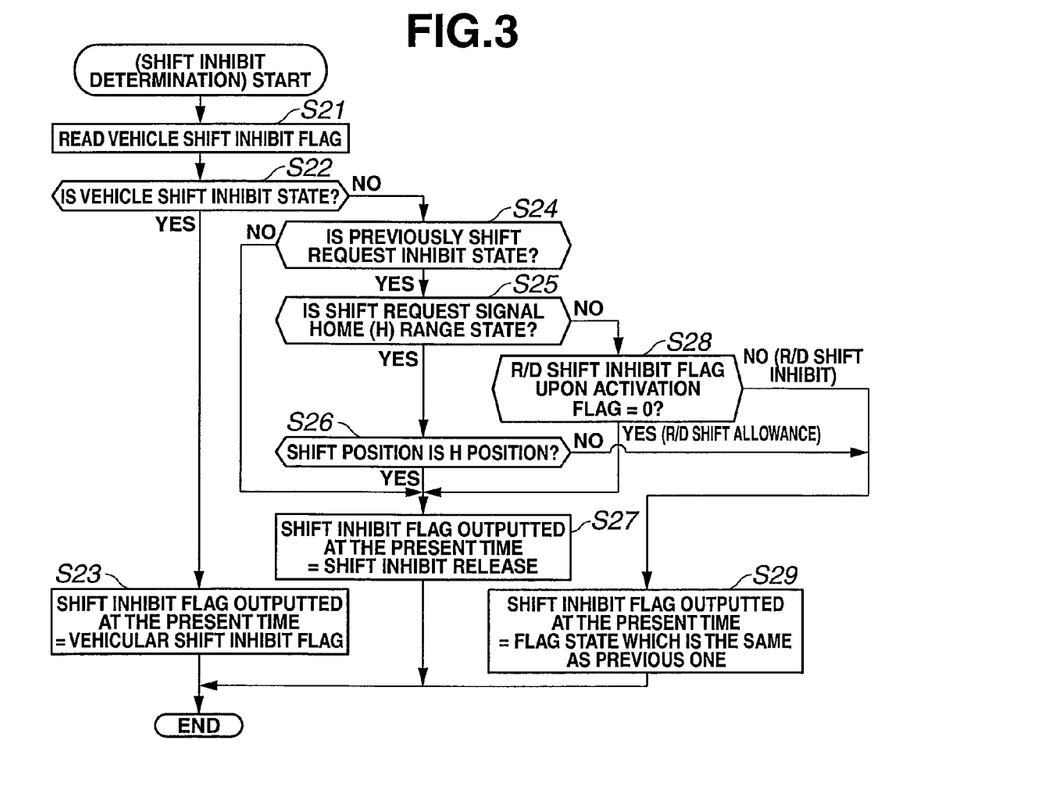
FIG. 3 is a flowchart representing a shift inhibit determination program executed by the electrically operated motor controller shown in FIG. 1.

In this embodiment, in view of a demand of the safety driving described above with reference to FIGS. 4 and 5, park lock controller 9 executes the control program shown in FIGS. 2 and 3 to achieve the desired object. FIG. 2 is an R/D shift inhibit determination program upon activation which serves to determine whether an R/D shift (the transfer to the reverse run mode and the transfer to the forward run mode) to solve the above-described problem when the ON state of ignition switch 11 causes the traveling drive system (electrically operated motor controller 4) to be made in the activation state.

At a step S11, electrically, operated motor controller 4 checks to see whether the traveling drive system (electrically operated motor controller 4) is in the activation state on a basis of a vehicle actual position signal supplied from electrically operated motor controller 4 shown in FIG. 1 to park lock controller 9.

If, at step S11, a determination is made that the traveling drive system (electrically operated motor controller 4) is not in the activation state (in the non-activation state), control is advanced to a step S12. At step S12, an R/D shift inhibit flag upon activation FLAG is set to 1 to determine that the R/D shift (the transfer to the reverse traveling mode or to the forward traveling mode) should be inhibited.

If a determination is made that the traveling drive system (electrically driven motor controller 4) is in the activation state at step S11, control is advanced to a step S13. At step S13, electrically operated motor controller 4 checks to see whether ignition switch 11 is turned to the ON state or OFF state and, at a step S14, electrically operated motor controller 4 checks to see whether shifter 12 is placed at the home (H) position.

At step S13, electrically operated motor controller 4 determines that ignition switch 11 is in the ON state and, at step S14, electrically operated motor controller 4 determines that shifter 12 is placed at the home (H) position. In this case, since the above-described problem such that the vehicle is started when the traveling drive system (electrically operated motor 4) is activated in response to the ON state of ignition switch 11 and when the shifter 12 is placed at the home (H) position does not occur, at a step S15, electrically operated motor controller 9 resets the R/D shift inhibit flag FLAG upon activation to zero and determines that the R/D shift (the transfer to the reverse traveling mode or the transfer to the forward traveling mode) should be allowed.

If ignition switch 11 is determined to be in the OFF state at step S13, the routine goes to a step S16. At step S16, electrically operated motor controller 9 holds R/D shift inhibit flag FLAG upon activation in the present set state (FLAG=1) or the reset sate (FLAG=0).

In addition, in a case where electrically operated motor controller 9 determines that shifter 12 is placed at a position other than the home (H) position at step S14, the R/D shift inhibit flag FLAG upon activation at step S16 is maintained (held) at the preset set state (FLAG=1) or at the reset state (FLAG=0).

FIG. 3 is a shift inhibit determination program to determine whether the shift including the park lock release should be inhibited using an R/D shift inhibit flag FLAG upon activation which is the determination result in FIG. 2.

At a step S21, electrically operated motor controller 4 reads a vehicle shift inhibit request flag from electrically operated motor controller 4 itself shown in FIG. 1. At the next step S22, electrically operated motor controller 4 checks to see whether park lock controller 9 executes the vehicle shift inhibit or not in accordance with the request from electrically operated motor controller 4.

In a case where park lock controller 9 determines that park lock controller 9 is in the vehicle shift inhibit state, the request from electrically operated motor controller 4 has a high priority and the routine goes to a step S23. At step S23, the vehicle shift inhibit request flag is set to the presently outputted shift inhibit flag to execute the shift inhibit in accordance with the request from electrically operated motor controller 4.

In a case where electrically operated motor controller 4 determines that park lock controller 9 is not in the vehicle shift inhibit state, no shift inhibit request from electrically operated motor controller 4 is issued. Hence, control is advanced to a step S24 and, thereafter, the following shift inhibit determination is made.

At step S24, electrically operated motor controller 4 checks to see whether park lock controller 9 is in the shift request inhibit state at the previous time from a previous shift inhibit determination result. If it is not in the shift request inhibit state at the previous time, control is advanced to a step S27 without determination at step S25 and step S26. At step S27, electrically operated motor controller 4 sets a shift inhibit release to the shift inhibit flag presently outputted to allow the shift without carrying out the shift inhibit.

In a case where electrically operated motor controller 4, at step S24, determines that park lock controller 9 is in the shift request inhibit state at the previous time, control is advanced to step S25 at which to electrically operated motor controller 4 checks to see whether the shift request signal indicates a home (H) range state corresponding to the home (H) position and, at step S26, the shift position (operated position of shifter 12) indicates the home (H) position.

If, at step S25, the shift request signal is determined to be not the home (H) range state, control is advanced to a step S28. At step S28, electrically operated motor controller 4 checks to see whether the transfer to the reverse traveling mode upon activation or the forward traveling mode upon activation is allowed depending on whether the R/D shift inhibit flag upon activation FLAG which is the determination result in FIG. 2 is turned to 0 or not.

If, at step S28, electrically operated motor controller 4 determines that the R/D shift inhibit flag upon activation FLAG is not 0, namely, if the transfer to the reverse traveling mode upon activation or the forward traveling mode upon activation is inhibited, control is advanced to a step S29. At step S29, the flag state which is the same as the previous one is set to the presently outputted shift inhibit flag so that the present shift inhibit state is continued.

In addition, in a case where, at step S25, electrically operated motor controller 4 determines that the shift request signal is in the home (H) range state and, at step S26, the shift position (operated position of shifter 12) is determined to be not in the home (H) position (No), control is advanced to step S29. At step S29, the flag state which is the same as the previous one is set to the presently outputted shift inhibit flag to continue the present shift inhibit state.

However, if electrically operated motor controller 4 determines that the R/D shift inhibit flag FLAG upon activation is 0 at step S28, namely, if the transfer of the reverse traveling mode upon activation or the forward traveling mode upon activation is allowed or if, at step S25, electrically operated motor controller 4 determines that the shift position (operated position of shifter 12) is the home (H) position at step S26, control is advanced to a step S27. At step S27, the shift inhibit release is set to the presently outputted shift inhibit flag to allow the shift without performing the shift inhibit.

<Action and Effects>

Figure 6:
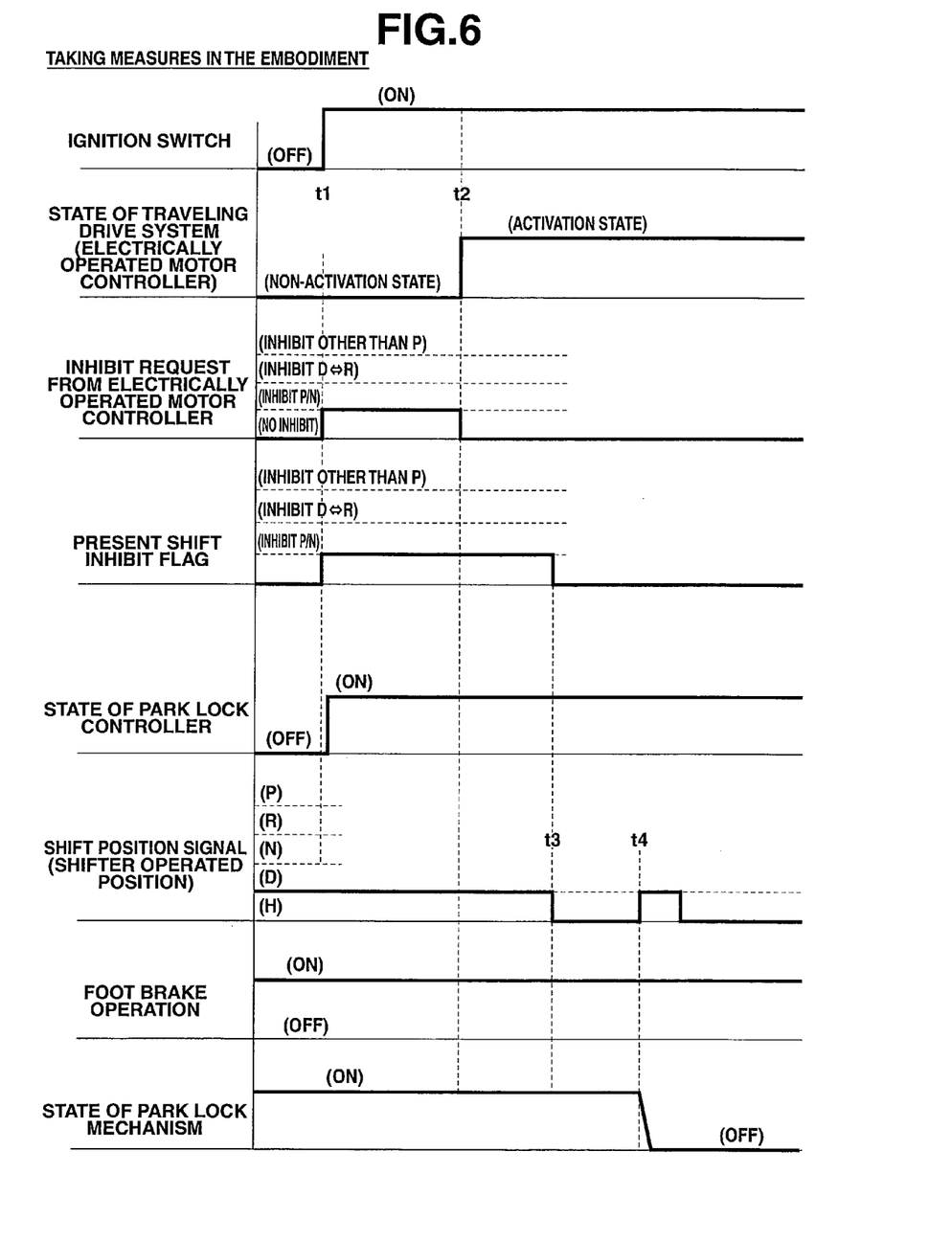
FIG. 6 is an operational timing chart for explaining a reason that such an situation that the vehicle is started due to an execution of a series of control programs in FIGS. 2 and 3 under the operation of the same condition as FIG. 4.
Figure 7:
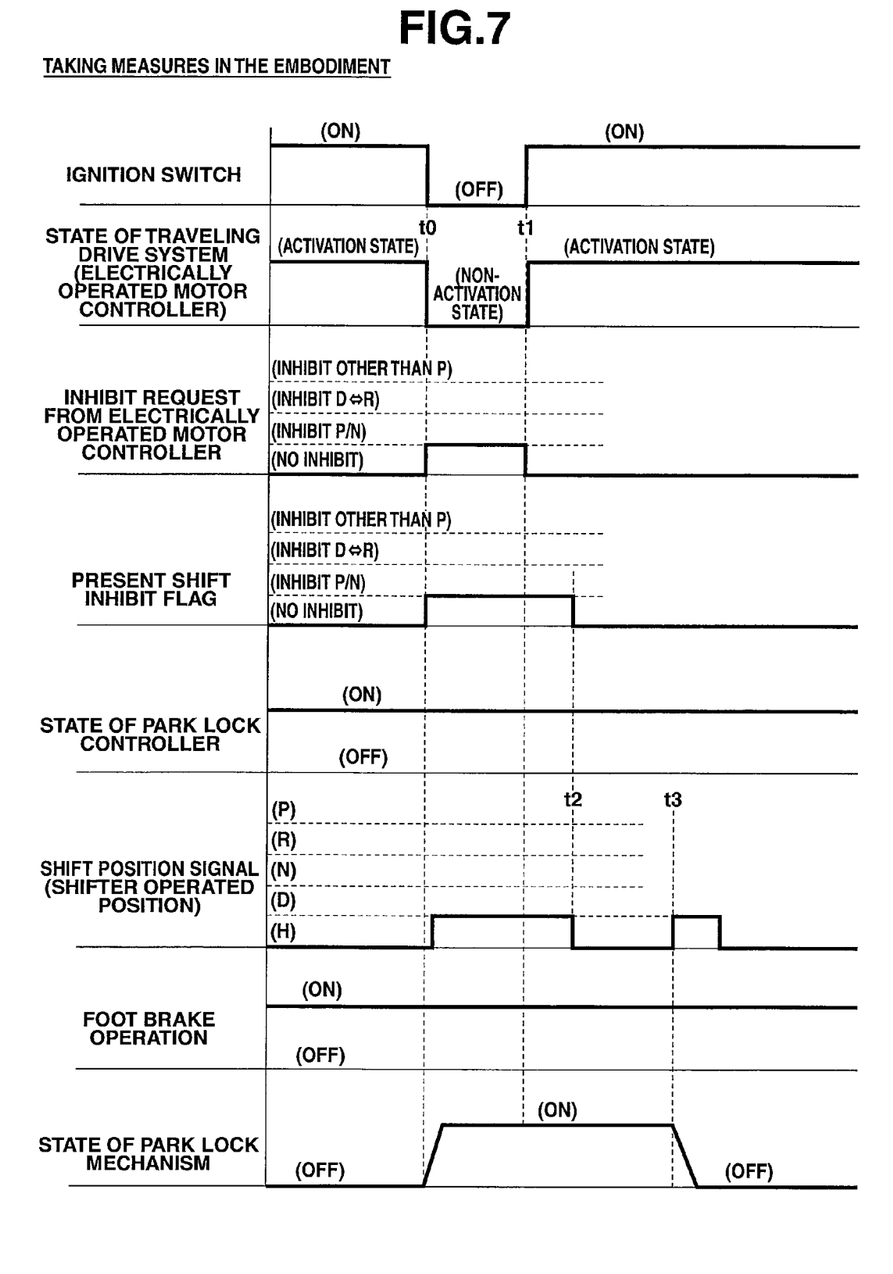
FIG. 7 is an operational flowchart for explaining a reason that such a situation that the vehicle is started against the intention of the driver by executing a series of control programs shown in FIGS. 2 and 3 in the operation under the same condition as FIG. 5.

According to the R/D shift inhibit determination during the activation shown in FIG. 2 and the shift inhibit determination shown in FIG. 3, such a problem that the vehicle driver doest not notice that shifter 12 is left operated from the home (H) position to the traveling (D/R) position so that the vehicle is started when the driver turns ignition switch 11 to ON state so that the traveling drive system (electrically operated motor controller 4) switches from the non-activation state to the activation state is eliminated as explained below on a basis of FIGS. 6 and 7.

It should be noted that FIG. 6 is an operational timing chart under the same condition as FIG. 4 and FIG. 7 is an operational flowchart under the same condition as FIG. 5.

In a case of FIG. 6, before instantaneous time t1 at which ignition switch 11 is turned to ON, step S11 in FIG. 2 selects step S12 to set RID shift inhibit flag FLAG to 1. However, since step S22 in FIG. 3 selects step S24, step S24 selects step S27 so that the shift inhibit release is set to presently outputted shift inhibit flag, as appreciated from the present shift flag at a time before instantaneous time t1 shown in FIG. 6, the shift inhibit is not carried out but the shift is allowed.

During a time duration from instantaneous time t1 at which ignition switch 11 is turned to ON to instantaneous time t2 at which the traveling drive system (electrically operated motor controller 4) is switched to the activation state along with the completion of the activation preparation in response to the ON state of ignition switch 11, step S11 shown in FIG. 2 selects step S12 to set the R/D shift inhibit flag FLAG to 1. However, step S22 in FIG. 3 selects step S24 and step S24 selects step S27 so that the vehicle shift inhibit flag, namely, P/N inhibit request shown between instantaneous times t1 and t2 shown in FIG. 6 (park lock release inhibit request) is set to the presently outputted shift inhibit flag. Therefore, as appreciated from the present shift flag between instantaneous times t1 and t2 shown in FIG. 6, the release of the park lock is inhibited.

Therefore, park lock controller 9 does not perform the park lock release even if the shift position signal (shifter operated position signal) is left operated at the forward (D) run position against the intention of the driver and maintains the state of park lock mechanism 7 in the ON state (park lock state).

Incidentally, when the time reaches to instantaneous time t2 shown in FIG. 6, the traveling drive system (electrically operated motor controller 4) switches to the activation state. Hence, accordingly, the P/N inhibit request (park lock release inhibit request) from electrically operated motor controller 4 vanishes as shown in FIG. 6. In a case where no control shown in FIGS. 2 and 3 in this embodiment is performed, the park lock release is executed by means of park lock controller 9 from instantaneous time t2 at which the P/N inhibit request (park lock release inhibit request) from electrically operated motor controller 4 vanishes. Thus, such a problem that the vehicle is started against the intention of the driver occurs.

However, in a case where a series of control programs shown in FIGS. 2 and 3 are used as described in this embodiment, a loop passing through steps S11, S13, S14, and S16 shown in FIG. 2 is selected at activation instantaneous time t2 in FIG. 6 so that shift inhibit flag upon activation FLAG is kept at the present set state "FLAG=1" (a state in which FLAG was set at step S12 at the previous time). In addition, the loop passing through step S22, step S24, step S25, step S28, and step S29 shown in FIG. 3 is selected so that the same flag state as the previous (at a time immediately before instantaneous time t2) time is set to the presently outputted shift inhibit flag. Hence, after instantaneous time t2 shown in FIG. 6, the present shift inhibit flag is kept in the P/N inhibit state (the park lock release inhibit state) immediately before instantaneous time t2 so that the state of park lock mechanism 7 can be maintained in the ON state (the park lock) of park lock mechanism 7.

Therefore, as shown in FIG. 6, such a problem that the vehicle is started at instantaneous time t2 at which the driver switches the traveling drive system (electrically operated motor controller 4) from the non-activation state to the activation state in response to the ON state of ignition switch 11 by the vehicle driver, without noticing that shifter 12 is kept operated from the home (H) position to the forward (D) run position against the intention of the driver as shown in FIG. 6, can be eliminated.

Hence, step S11 corresponds to system activation detecting means in the case of the present invention, step S14 corresponds to shift abnormality detecting means in the case of the present invention, and step S16 (step S12), step S28, and step S29 correspond to traveling mode transfer inhibiting means in the case of the present invention.

At subsequent instantaneous time t3 after instantaneous time t2, the driver notices that shifter 12 is kept operated from the home (H) position to the forward (D) run position due to a presence of an obstacle and the driver removes this obstacle. As a result of this, shifter 12 is self reset (automatically reset) from the forward (D) run position to the home (H) position.

At this time, the loop passing through steps S11, S13, S14, and S15 in the case shown in FIG. 2 is selected, the R/D shift inhibit flag upon activation FLAG is reset to 0, and the R/D shift (the transfer to the reverse (backward) traveling mode or to the forward traveling mode) is allowed.

In addition, the loop passing through steps S22, S24, S28, and S27 in the case shown in FIG. 3 is selected so that the shift inhibit release is set to the presently outputted shift inhibit flag. Hence, since the shift inhibit release is set to the presently outputted shift inhibit flag, the state in which the park lock release is not inhibited occurs as viewed from the time duration after instantaneous time t3 shown in FIG. 6.

Hence, steps S14, S15, S28, and S27 correspond to shift abnormality detecting means in the case of the present invention.

Therefore, after instantaneous time t3 in FIG. 6, for example, at an instantaneous time t4, after the driver desires the forward traveling and operates shifter 12 from the home (H) position to the forward (D) run position and, thereafter, the driver releases his hand from shifter 12 so that shifter 12 is self-reset to the home (H) position. Consequently, the shift position signal (the shifter operated position) of the forward (D) run as shown in FIG. 6 is outputted. Upon receipt of this output signal, park lock controller 9 can switch the state of park lock mechanism 7 from N (park lock) state to OFF (park lock release) state so that the vehicle can make a forward run under a control by means of electrically operated motor controller 4.

In a case of FIG. 7, at a time before instantaneous time t0 at which the traveling drive system (electrically operated motor controller 4) is in the non-activation state in response to the OFF state of ignition switch 11, the loop passing through steps S11, S13, S14, and S15 shown in FIG. 2 is selected so that R/D shift inhibit flag upon activation FLAG is reset to 0, the R/D shift (the transfer to the reverse movement traveling mode and the forward movement traveling mode) is allowed. In addition, the loop passing through steps S22, S24, and S27 shown in FIG. 3 is selected and the shift inhibit release is set to the presently outputted shift inhibit flag. Hence, the shift inhibit is not carried out and the shift is allowed as appreciated from the present shift inhibit flag at a time before instantaneous time t0 shown in FIG. 7.

During the time duration from instantaneous time t0 at which the traveling drive system (electrically operated motor controller 4) is made in the non-activation state in response to the OFF state of ignition switch 11 to instantaneous time t1 at which the traveling drive system (the electrically operated motor controller) is re-activated in response to the ON state of ignition switch 11, the loop passing through steps S11 and S12 shown in FIG. 2 is selected so that R/D shift inhibit flag FLAG is set to 1. However, the loop passing through steps S22 and S23 shown in FIG. 3 is selected so that the vehicle shift inhibit request flag read at step S21, namely, the P/N inhibit request (park lock release inhibit request) is set to the presently outputted shift inhibit flag. Therefore, as appreciated from the present shift (inhibit) flag between instantaneous times of t1 and t1 shown in FIG. 7, the inhibit of the park lock release in accordance with the request from electrically operated motor controller 4 is executed.

Park lock controller 9 does not correspondingly make park lock mechanism 7 the park lock release and maintains the state of park lock mechanism 7 in the ON (park lock) state even if the shift position signal (the shifter operated position signal) is placed at the forward (D) run position immediately after instantaneous time t0 against the intention of the vehicle driver.

Incidentally, since, when the time has arrived at instantaneous time t1 shown in FIG. 1, the traveling drive system (electrically operated motor controller 4) switches to the activation state, P/N inhibit request (park lock release inhibit request) from electrically operated motor controller 4 vanishes as shown in FIG. 7.

In a case where the control of each of FIGS. 2 and 3 in the preferred embodiment is not performed, as described before with reference to FIG. 5, from instantaneous time t1 at which the P/N inhibit request (park lock release inhibit request) from electrically operated motor controller 4 (the park lock release inhibit request) vanishes, so that a problem such that the park lock release by means of park lock controller 9 is executed and the vehicle is started against the intention of the driver occurs.

However, in a case where, as described in the preferred embodiment, the control programs shown in FIGS. 2 and 3 are used, the loop passing through steps S11, S13, S14, and S16 shown in FIG. 2 is selected at instantaneous time t1 in FIG. 7 at which the re-activation is carried out and R/D shift inhibit flag upon activation FLAG is maintained at the present set state "FLAG=1" (the state in which this flag is set at step S12 at the previous time). In addition, the loop passing through step S22, step S25, step S28, and step S29 is selected in the case of FIG. 3 and the same flag state as the previous one (at a time immediately before instantaneous time t2) is set to the presently outputted shift inhibit flag. Hence, the present shift inhibit flag is maintained at the P/N inhibit state (park lock release inhibit state) at the time immediately before instantaneous time t1 so that the state of park lock mechanism 7 can be maintained at the ON (park lock) state.

Therefore, such the above-described problem that the driver does not notice that shifter 12 is kept operated from the home (H) position to the forward (D) run position at the time immediately after instantaneous time t0 against the intention of the driver as shown in FIG. 7 and the vehicle is started at instantaneous time t1 at which the traveling drive system (electrically operated motor controller 4) is re-activated in response to the turning ignition switch 11 to ON state can be eliminated.

When the driver notices that shifter 12 is kept operated from the home (H) position to the forward (D) run position due to the presence of the obstacle at subsequent instantaneous time t2 and the driver removes this obstacle. As a result of this, when shifter 12 is self reset from the forward (D) run position to the home (H) position, the loop passing through steps S11, S13, S14, and S15 in the case of FIG. 2 s selected, R/D shift inhibit upon activation FLAG is reset to 0 to allow the R/D shift (the transfer to the reverse traveling mode or to the forward traveling mode), and the loop passing through steps S22, S24, S25, S28, and S27 in the case of FIG. 3 is selected so that the shift inhibit release is set to the presently outputted shift inhibit flag. Therefore, the present shift inhibit flag is in the state in which the park lock release is not inhibited as viewed from the time after instantaneous time t2 shown in FIG. 7.

Therefore, at, for example, instantaneous time t3 after instantaneous time t2 in FIG. 7, shifter 12 is self-reset (automatically rest) to the home (H) position due to the release of the driver from shifter 12, after the driver desires in order for the vehicle to be traveled in the forward direction and operates shifter 12 from the home (H) position to the forward (D) run position. As a result of this, a shift position signal (the shifter operated position) of the forward (D) run direction as shown in FIG. 7 is outputted. Upon receipt of this shift position signal, park lock controller 9 can switch the state of park lock mechanism 7 from the ON state (park lock) to the OFF state (park lock release). Thus, the vehicle can be traveled in the forward direction under the control of electrically operated motor controller 4.

It should be noted that, in FIGS. 6 and 7, the action and effects through the series of control programs shown in FIGS. 2 and 3 have been explained in a case where shifter 12 is kept operated from the home (H) position to the forward (D) run position due to the presence of the obstacle. However, according to the series of programs shown in FIGS. 2 and 3, it is of course that the same action and effects can be obtained in a case where shifter 12 is kept operated from the home (H) position to the reverse (R) run position.

In addition, as described in the example shown in FIGS. 1 through 7, only detecting the switching of the traveling drive system (electrically operated motor controller 4) to the activation state (step S11) and detecting (step S14) that shifter 12 is kept in a position (D or R position) other than the home (H) position which is the reference position, namely, only carrying out the detections using the generally existent signals, the above-described action and effects can be achieved at a low cost without addition of new component(s) and without addition of wire-harness.

Other Embodiments

As described above, according to the control programs shown in FIGS. 2 and 3, in a case where the driver activates the traveling drive system (electrically operated motor controller 4) in response to the ON state of ignition switch 11 without notice of the driver that shifter 12 is kept operated from the home (H) position to the traveling (D, R) position from home position (H) position due to the presence of the obstacle, such the situation that the vehicle is started against the intention of the driver can be prevented from occurring.

However, the prevention of the start of movement of the vehicle against the intention of the vehicle driver is advantageous in that breakages of a connection purpose power supply cable and a connector can be prevented in a state in which the electric automotive vehicle is connected to an external power supply when charging battery 5.

However, after shifter 12 is self reset to the home (H) position due to the notice of the presence of the obstacle and the removal of this obstacle, the inhibit of the park lock release is not carried out as described above so that the vehicle can be started.

However, the vehicle is started without notice by the driver that the electric automotive vehicle is connected to the external power supply when battery 5 is charged. At this time, the power supply cable or connector between the electric automotive vehicle and the external power supply is broken.

It is preferable that such a situation as described above can be avoided. In order to achieve this avoidance measure, external power supply connection state detecting means for detecting whether an electrical connection state between the vehicle and the external power supply is made is disposed, although not shown, and, while this means detects the electrical connection state between the vehicle and the external power supply, the inhibit of the park lock release is continued even after shifter 12 is self reset (automatically reset) to the home (H) position due to the removal of the obstacle.

The continuation of the inhibit of the park lock release keeps the park lock state only if the vehicle is electrically connected to the external power supply.

As a result of this, such a carelessness that the driver unintentionally starts the vehicle in spite of the fact that the vehicle is electrically connected to the external power supply so that the power supply cable or the connector is broken can be avoided.

The invention claimed is:

1. A control apparatus for taking measures against a shift abnormality upon activation for an electrically driven vehicle equipped with a battery that is electrically connectable to and chargeable via an external power supply, startable via motive power from an electrically operated motor, and configured to travel in a traveling mode corresponding to a signal from a momentary shifter when, with a traveling drive system of the electrically driven vehicle activated, the momentary shifter is operated from a reference position, the control apparatus comprising:
    a shift abnormality detecting device configured to detect whether the momentary shifter is kept at a position other than the reference position; and
    a traveling mode transfer inhibiting device configured to inhibit a transfer to the traveling mode corresponding to the position other than the reference position while the shift abnormality detecting device detects that the momentary shifter is kept at the position other than the reference position.

2. The control apparatus as claimed in claim 1, further comprising:
    an external power supply connection state detecting device configured to detect whether the electrically driven vehicle is electrically connected to the external power supply,
    wherein the traveling mode transfer inhibiting device is configured to inhibit the transfer to the traveling mode while the external power supply connection state detecting device detects that the electrically driven vehicle is electrically connected to the external power supply.

3. The control apparatus as claimed in claim 2, further comprising:
    a shift abnormality elimination detecting device configured to detect whether the momentary shifter returns from the position other than the reference position to the reference position,
    wherein the traveling mode transfer inhibiting device is configured to continue inhibition of the transfer to the traveling mode even after the shift abnormality elimination detecting device detects that the momentary shifter has returned to the reference position while the external power supply connection state detecting device detects that the electrically driven vehicle is electrically connected to the external power supply.

4. The control apparatus as claimed in claim 3, wherein the traveling mode transfer inhibiting device is configured to release the inhibition of the transfer to the traveling mode when the external power supply connection state detecting device detects that the electrically driven vehicle is not electrically connected to the external power supply and the shift abnormality elimination detecting device detects that the momentary shifter has returned to the reference position.

* * * * *